No. 856,526. PATENTED JUNE 11, 1907.
T. F. HAMILTON.
TIRE FOR VEHICLE WHEELS.
APPLICATION FILED FEB. 23, 1906.
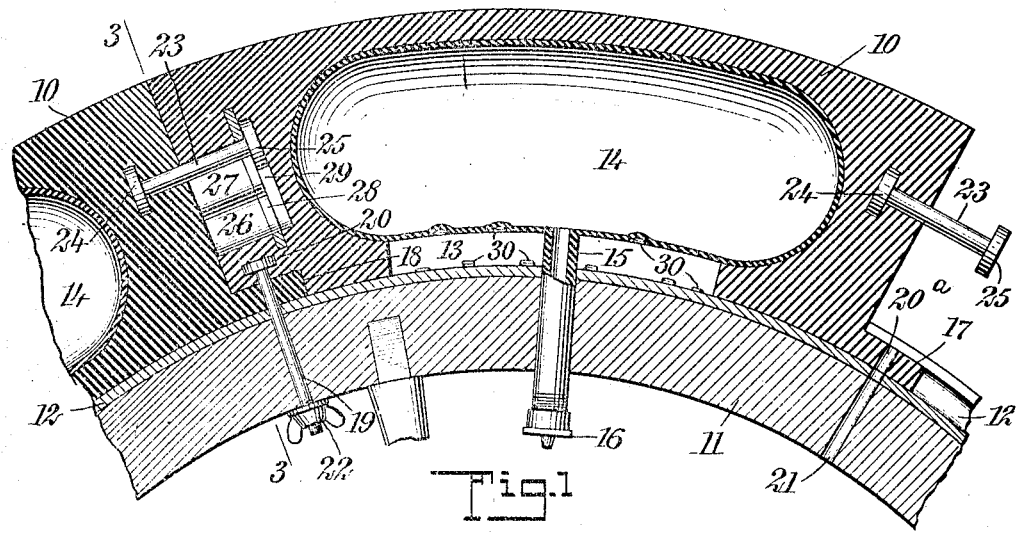
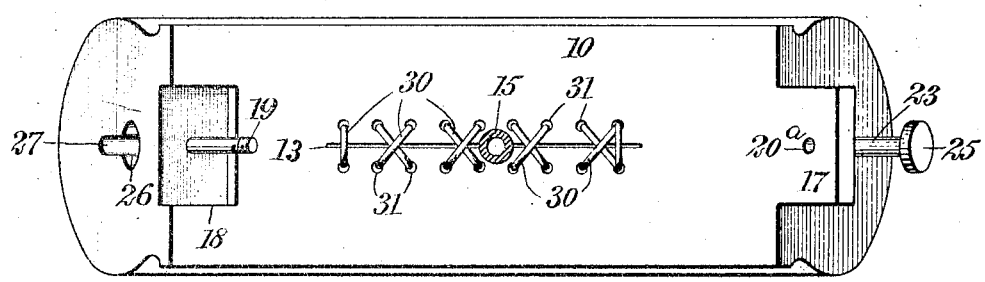
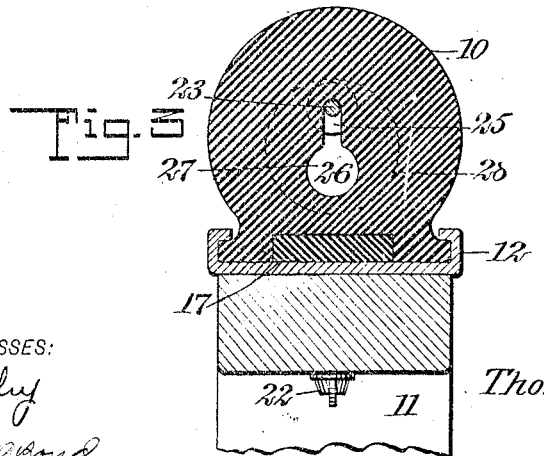
WITNESSES:
INVENTOR
Thomas F. Hamilton
BY
ATTORNEYS

UNITED STATES PATENT OFFICE.

THOMAS F. HAMILTON, OF CHICAGO, ILLINOIS.

TIRE FOR VEHICLE-WHEELS.

No. 856,526.     Specification of Letters Patent.     Patented June 11, 1907.

Application filed February 23, 1906. Serial No. 302,437.

*To all whom it may concern:*

Be it known that I, THOMAS F. HAMILTON, a citizen of the United States, and a resident of Chicago, in the county of Cook and State of Illinois, have invented a new and Improved Tire for Vehicle-Wheels, of which the following is a full, clear, and exact description.

My invention relates to improvements in vehicle wheel tires, a special object being to provide a tire formed of a plurality of similar segments so connected and secured, that in case of injury to one or more segments, said injured segments can be readily removed and replaced with new ones.

The invention also embodies improved means for connecting said segments, one to the other, and means for fastening said segments to the rim of a vehicle wheel.

The invention consists of novel features and parts and combinations of the same, which will be more fully described hereinafter and pointed out in the claims.

Reference is to be had to the accompanying drawings forming a part of this specification, in which similar characters of reference indicate corresponding parts in all the figures.

Figure 1 is a sectional view of a portion of my vehicle tire showing also a portion of a vehicle wheel to which said tire is attached; Fig. 2 is a view of one segment of my vehicle wheel tire looking toward the inner peripheral side; and Fig. 3 is a cross section on the line 3—3 of Fig. 1.

The tire comprises a plurality of tire segments 10, preferably formed of rubber, or like material. Each tire segment in the direction of its length is curved to the arc of a circle in order to conform to the circumference of a vehicle wheel 11, and the ends of said tire segment lie in planes radial to said circle. The segments 10 may be of any suitable cross section, such as indicated in Fig. 3, and adapted to fit into a wheel rim 12, on the vehicle wheel 11. Each tire segment 10 is formed with an interior chamber, access to which may be had through a slit or opening 13. This chamber is adapted to receive an air sack 14, preferably made of soft rubber. Said air sack may be inflated through a tube 15, which extends through the opening 13, and the rim 12, and the felly of the vehicle wheel 11. The exterior end of this tube may be provided with the usual valve protected by the cap 16. Each tire segment is formed at one end which, for convenience, I term the forward end, with a tongue 17, while at the opposite or rear end is a recess 18. The latter is of a size to receive the tongue 17 of an adjacent tire segment. Projecting from the upper wall of this recess is a bolt 19, provided with a head 20, which is embedded in the tire segment and preferably vulcanized therein. The shank of the bolt 19 is adapted to pass through a hole $20^a$, in the adjacent tongue 17, and through a hole 21, formed in the rim and felly of the vehicle wheel. A thumb nut 22, threaded on to the outer end of this bolt is tightened against the inner periphery of the felly thus fastening the forward end of one segment and the rear end of the other segment firmly in place, and at the same time connecting said segments together. As an additional means of connecting the segments together, each tire segment is provided with a tie-piece 23, consisting of a shank formed with a head 24, at one end, and a similar head 25 at the other. Said tie-piece projects from the forward end of the tire segment, the head 24 being embedded and vulcanized in the tire segment.

At the rear end of each tire segment is a passage 26, of a diameter sufficient to admit the head 25. A slot 27 is formed in the upper wall of said passage. A disk of metal 28 is embedded in the tire segment transversely to the slot and passage, and said passage and slot extend through the disk into a recess 29. The latter is large enough to permit the head 25 of a tie-piece being inserted therein through the passage 26, and raised until the shank of the tie-piece engages the top of the slot 27. Two adjacent tire segments are thus joined by passing the tie-piece on the forward end of one segment into the passage 26 at the rear end of the other, and raising said tie-piece so that the head 25 thereon will be caught by the disk 28. The depth of the passage 26, and the length of the projecting portion of the tie-piece 23, are such as to bind the tire segments tightly together. In assembling the tire the air sacks in a deflated condition are inserted into the chamber of the tire segments 10, through the openings 13. The openings are then closed by means of lace strings 30, laced through perforations 31, formed in the tire segments at opposite sides of said openings. The bolts 19 are then passed through the tongues 17 and the tie-pieces are pressed into engagement with their respective disks 28. The tire segments are then secured to the wheel rim by tightening the nuts 22, after which the air sacks are inflated through the tubes 15.

While I have described my invention as relating to a pneumatic tire, it will be evident that the same method of securing the segments together would apply to segments of solid form, or of cushion form, and I therefore desire it to be distinctly understood that my invention covers a cushion tire and a solid tire as well as a pneumatic tire.

Having thus described my invention, I claim as new and desire to secure by Letters Patent:

1. A wheel tire comprising a plurality of tire segments, each of said segments being formed at one end with a tongue having a hole therein, and at the opposite end with a recess, said recess on one of said tire segments being adapted to receive said tongue on an adjacent tire segment, a bolt secured to each of said segments, the shank of said bolt projecting from said recess, said shank in one of said tire segments being adapted to pass through said hole in the tongue of an adjacent tire segment, said shank being also adapted to pass through the felly of a wheel, and a nut adapted to be threaded onto said shank, so as to secure said tire segment to said felly.

2. A wheel tire comprising a plurality of tire segments, a tie-piece secured to and projecting from one end of each of said segments, said tie-piece being formed with a shank and a head, the opposite end of said tire segment being formed with a passageway constricted at one side thereof, and with a recess at the inner end of said passageway, said recess serving to receive the head of said tie-piece of an adjacent tire segment, and said constricted portion of said passageway adapted to receive the shank of said tie-piece of said adjacent tire segment.

3. A wheel tire comprising a plurality of tire segments, a tie-piece secured to and projecting from the end of each of said segments, said tie-piece being formed with a shank and a head, the opposite end of said tire segment being formed with a passageway constricted at one side thereof, a metal plate at the inner end of said passageway lying transversely thereto, a recess at the inner side of said plate, and an opening in said plate coinciding with said passageway and communicating with said recess, said recess serving to receive the head of said tie-piece of an adjacent tire segment and said constricted portions of said passageway adapted to receive the shank of said tie-piece of said adjacent tire segment.

4. A wheel tire comprising a plurality of tire segments, a tie-piece secured to and projecting from the end of each of said segments, said tie-piece being formed with a shank and a head, the opposite end of said tire segment being formed with a passageway constricted at one side thereof, a metal plate at the inner end of said passageway lying transversely thereto, a recess at the inner side of said plate, an opening in said plate coinciding with said passageway and communicating with said recess, said recess serving to receive the head of said tie-piece of an adjacent tire segment and said constricted portions of said passageway adapted to receive the shank of said tie-piece of said adjacent tire segment, and means for securing said segments to the felly of a wheel.

5. A wheel tire comprising a plurality of tire segments, each of said segments being formed at one end with a tongue having a hole therein and at the opposite end with a recess, said recess on one of said tire segments being adapted to receive said tongue on an adjacent tire segment, a bolt secured to each of said segments, the shank of said bolt projecting from said recess, said shank on one of said tire segments being adapted to pass through said hole in said tongue of an adjacent tire segment, said shank being also adapted to pass through the felly of a wheel, a nut adapted to be threaded onto said shank so as to secure said tire segments to said felly, a tie-piece secured to and projecting from the end of each of said segments, said tie-piece being formed with a shank and a head, the opposite end of said tire segments being formed with a passageway constricted at one side thereof, a metal plate at the inner end of said passageway lying transversely thereto, a recess at the inner side of said plate, and an opening in said plate coinciding with said passageway and communicating with said recess, said recess serving to receive the head of said tie-piece of an adjacent tire segment, and said constricted portion of said passageway adapted to receive the shank of said tie-piece of said adjacent tire segment.

6. A wheel tire comprising a plurality of air sacks, means for inflating said air sacks, a plurality of hollow tire segments adapted to receive said air sacks, each of said segments being formed at one end with a tongue having a hole therein, and at the opposite end with a recess, said recess on one of said tire segments being adapted to receive said tongue on an adjacent tire segment, a bolt secured to each of said segments, the shank of said bolt projecting from said recess, said shank on one of said tire segments being adapted to pass through said hole in said tongue of an adjacent tire segment, said shank being also adapted to pass through the felly of a wheel, a nut adapted to be threaded onto said shank so as to secure said tire segments to said felly, a tie-piece secured to and projecting from the end of each of said segments, each of said segments being formed at the opposite end with a passageway constricted at one side thereof, a metal plate at the inner end of said passageway lying transversely thereto, a recess at the inner side of said plate, and an opening in said plate coinciding with said passageway and communicating with said recess, said recess serving to receive the head of said tie-piece of an adjacent tire segment, and said constricted portion of said passageway adapted to receive the shank of said tie-piece of said adjacent tire segment.

In testimony whereof I have signed my name to this specification in the presence of two subscribing witnesses.

THOMAS F. HAMILTON.

Witnesses:
SAM E. BROWN,
F. W. SMITH.